UNITED STATES PATENT OFFICE.

HEINRICH CARO, OF MANNHEIM, GRAND DUCHY OF BADEN, GERMANY.

IMPROVEMENT IN ETHYL-ROSANILINE DYE-STUFFS.

Specification forming part of Letters Patent No. 204,798, dated June 11, 1878; application filed March 28, 1878.

*To all whom it may concern:*

Be it known that I, HEINRICH CARO, of Mannheim, in the Grand Duchy of Baden, in the Empire of Germany, have invented a new and useful Improvement in Dye-Stuffs and Coloring-Matters, which improvement is fully set forth in the following specification.

This invention consists in a dye-stuff or coloring-matter produced from the reaction of iodide of ethyl or the sulpho-acid of rosaniline or fuchsine.

In treating the sulpho-acid of fuchsine with iodide of ethyl, for instance, I proceed as follows: I take ten kilograms of the soda-salt of the sulpho-acid of the fuchsine, fifty liters of water, fifty liters of alcohol of ninety per cent., seven hundred and fifty grams of soda-lye of 1.38 specific gravity, 1.3 kilograms of iodide of ethyl, and heat the mixture to the boiling-point in a copper still provided with a steam-jacket, and with a condenser adapted to return the products of condensation to the still.

As soon as the liquid, which at first has a yellowish-brown color, assumes a violet-red tint, I add again seven hundred and fifty grams of soda-lye of 1.38 specific gravity, and 1.3 kilograms of iodide of ethyl, and repeat this process every time the violet-red tint appears, until I have used altogether 4.5 kilograms of soda-lye of 1.38 specific gravity, and 7.8 kilograms of iodide of ethyl. Then the contents of the still are neutralized with muriatic acid, and the alcohol is distilled off.

After cooling off, the liquid remaining in the still is treated with an aqueous solution of sulphurous acid until the latter predominates, and then it is left to itself for twelve hours.

From the nearly-decolorized liquid the iodine can be recovered in the form of subiodide of copper. The liquid, which is separated from this subiodide by filtration, is heated until the sulphurous acid has been driven out. It is then freed from the surplus of the copper salt used for recovering the iodine, and, after rendering it slightly acid by the addition of muriatic acid, it is inspissated by evaporation.

It must be remarked that the same process is, also, applicable to sulpho-acids of other basic coloring-matters, such as the sulpho-acid of methyl-violet; but the products derived by treating such other sulpho-acids will form the subject-matter of subsequent applications for patents, and I do not, therefore, describe the same in this specification.

By treating the sulpho-acid of fuchsine with iodide of ethyl, or with any other halogen compound of a similar nature, a new dye-stuff or coloring-matter is obtained, which has the following characteristics: It produces nearly the same purple or violet shades which are produced by the basic violet, methyl-violets, or the basic substitution products of fuchsine, from which this sulpho-acid may be considered to be derived.

The free sulpho-acid and its salts are soluble in water by strong acids. The color produced by it is only changed with great difficulty.

The dyeing is done principally in a boiling dye-bath, with the addition of mineral or organic acids, alumina, and tin mordants, or with other mordants, such as are generally used in dyeing and printing.

The ethylated sulpho-acid of rosaniline, when produced in the form of a powder, has a purple color not dichroic.

What I claim as new, and desire to secure by Letters Patent, is—

As a new manufacture, a dye-stuff or coloring-matter having the characteristics above described, and produced from the reactions of iodide of ethylon, the sulpho-acid of rosaniline, or by any other means which will produce a like result.

In testimony that I claim the foregoing I have hereunto set my hand and seal this 22d day of February, 1878.

HEINRICH CARO. [L. S.]

Witnesses:
 WM. PICKHARDT,
 C. GLASER.